(12) United States Patent
Xu et al.

(10) Patent No.: US 12,319,568 B2
(45) Date of Patent: Jun. 3, 2025

(54) EV-GRADE HIGH-PURITY LITHIUM SULFIDE AND PREPARATION METHOD FOR THE SAME

(71) Applicant: TIANQI LITHIUM CORPORATION, Sichuan (CN)

(72) Inventors: Chuan Xu, Suining (CN); Ge Chen, Suining (CN); Huan Tian, Suining (CN); Jiale Sun, Suining (CN); Liu Yang, Suining (CN); Zhaozi Zhong, Suining (CN); Zhen Lei, Suining (CN); Yibao Gao, Suining (CN)

(73) Assignee: TIANQI LITHIUM CORPORATION, Suining (CN)

( * ) Notice: Subject to any disclaimer, the term of this patent is extended or adjusted under 35 U.S.C. 154(b) by 0 days.

(21) Appl. No.: 18/774,468

(22) Filed: Jul. 16, 2024

(65) Prior Publication Data

US 2025/0091867 A1    Mar. 20, 2025

(30) Foreign Application Priority Data

Sep. 20, 2023   (CN) .................. 202311216612.X

(51) Int. Cl.
 *C01B 17/36*    (2006.01)
(52) U.S. Cl.
 CPC .......... *C01B 17/36* (2013.01); *C01P 2004/61* (2013.01); *C01P 2006/40* (2013.01); *C01P 2006/80* (2013.01)
(58) Field of Classification Search
 CPC .................................................. C01B 17/36
 See application file for complete search history.

(56) References Cited

FOREIGN PATENT DOCUMENTS

| | | |
|---|---|---|
| CN | 112678781 A | 4/2021 |
| CN | 112777571 A | 5/2021 |
| CN | 113415812 A | 9/2021 |
| CN | 114477099 A | 5/2022 |
| CN | 115535968 A | 12/2022 |
| CN | 116040587 A | 5/2023 |
| CN | 117069067 A | 11/2023 |
| JP | 2013-103851 A | 5/2013 |

OTHER PUBLICATIONS

Dec. 30, 2023 Office Action issued in Chinese Application No. 202311216612.X.
Jan. 19, 2024 Office Action issued in Chinese Patent Application No. 202311216612X.
Jun. 13, 2024 International Search Report issued in International Patent Application No. PCT/CN2024/079884.
Jan. 31, 2024 Notification of Grant issued in Chinese Patent Application No. 202311216612X.

*Primary Examiner* — James A Fiorito
(74) *Attorney, Agent, or Firm* — Oliff PLC

(57) ABSTRACT

EV-grade high-purity lithium sulfide and a preparation method therefor, including: A. mixing and well grinding a lithium source and a sulfur source to obtain a mixture; B. primary reaction: mixing the mixture with hydrazine hydrate in an inert atmosphere and reacting to obtain an intermediate slurry; C. secondary reaction: performing secondary reaction on the intermediate slurry in the inert atmosphere and drying to obtain a crude lithium sulfide product; and D. calcining and ball milling the crude lithium sulfide product to obtain the EV-grade high-purity lithium sulfide. The purity of the EV-grade high-purity lithium sulfide prepared by the method is above 99.9%, the whiteness thereof is above 80, and D50≤15 μm; the method is characterized by simple process operation, high safety, low energy consumption, low equipment requirements and low production cost; therefore, the method is suitable for industrial production.

12 Claims, No Drawings

EV-GRADE HIGH-PURITY LITHIUM SULFIDE AND PREPARATION METHOD FOR THE SAME

CROSS-REFERENCE TO RELATED APPLICATIONS

This application claims the rights and interests and priority of Chinese Patent Application CN 202311216612X filed on Sep. 20, 2023, and this application is hereby incorporated by reference in its entirety for all other purposes.

FIELD OF THE INVENTION

The invention relates to EV-grade high-purity lithium sulfide and a preparation method therefor, and pertains to the technical field of lithium battery materials.

BACKGROUND OF THE INVENTION

In recent years, with the rapid development of new energy electric vehicles, the problems of short battery life, long charging time and poor safety of traditional liquid lithium-ion batteries have been gradually exposed, which hinders the further development of the electric vehicle market. Since high-energy-density battery systems, such as lithium-sulfur batteries, lithium-oxygen batteries and all-solid-state batteries, are expected to solve the technical problems of electric vehicle batteries, they will attract much attention. Among them, the all-solid-state batteries have attracted great attention in the market because of their high energy density, wide working temperature range, good safety, long cycle life and the like, and therefore they have the most commercial prospects. As a key component of the all-solid-state batteries, sulfide solid electrolyte has become the most potential technical route because of its high ionic conductivity, easy processing and good electrochemical stability. Lithium sulfide ($Li_2S$) is a key precursor material for the synthesis of sulfide solid electrolyte, but it is extremely susceptible to water and air. This imposes many restrictions on production and storage, and therefore the lithium sulfide is difficult for industrial production, thereby leading to the extremely high price thereof and restricting the development of sulfide solid-state batteries.

For Patent CN112678781A, lithium hydroxide monohydrate is used as a lithium source, sulfur powder is used as sulfur source and hydrazine hydrate is used as a reducing agent to synthesize and prepare a lithium sulfide intermediate product; then, the intermediate product is further dehydrated and dried to prepare a high-purity lithium sulfide product. The process has the advantages of simple process, strong operability and low energy consumption; raw materials have low requirements for equipment, batch production is stable, toxic gas and secondary pollution are not generated, and the requirements for safe operation and commercial lithium sulfide can be met. However, the purity of the dried lithium sulfide product is low, and the highest purity thereof can only reach 97.88%. In addition, the whiteness thereof is also low. Whiteness represents the degree of whiteness on the surface of an object, which is expressed as a percentage of whiteness. The main factors affecting the whiteness of lithium sulfide include impurities, particle size and particle size distribution. The high purity indicates the small particle size and the high whiteness of lithium sulfide. Therefore, the purity and particle size of lithium sulfide can be further improved by increasing the whiteness of the product. The important indexes to apply lithium sulfide to a downstream sulfide solid electrolyte are its purity and particle size.

BRIEF SUMMARY OF THE INVENTION

The purposes of the invention are to provide a new preparation method for EV-grade high-purity lithium sulfide.

In order to achieve the first purpose of the invention, the preparation method for EV-grade high-purity lithium sulfide includes:
A. mixing and well grinding a lithium source and a sulfur source to obtain a mixture;
B. primary reaction: mixing the mixture with hydrazine hydrate in an inert atmosphere and reacting to obtain an intermediate slurry;
C. secondary reaction: performing secondary reaction on the intermediate slurry in the inert atmosphere and drying to obtain a crude lithium sulfide product; and
D. calcining and ball milling the crude lithium sulfide product to obtain the EV-grade high-purity lithium sulfide.

The inert atmosphere in the invention refers to a gas atmosphere that does not react with a reaction system.

In a specific embodiment, in Step A, the lithium source is at least one of lithium hydroxide monohydrate, lithium sulfite and lithium thiosulfate, and the sulfur source is at least one of sulfur powder, lithium sulfite and lithium thiosulfate.

In a specific embodiment, in Step A, the lithium source and the sulfur source are added in a molar ratio of $Li_2O:S=1:1-2$.

In a specific embodiment, in Step B, the hydrazine hydrate is added in a molar ratio of $Li_2O:N_2H_2 \cdot H_2O=1:2-4$; preferably, the hydrazine hydrate is added in three batches, with an interval of 0.5-1 hour for each addition.

In a specific embodiment, in Step B, the mixing and reaction includes stirring at 30° C.-70° C. for 1-5 hours; and a stirring speed is preferably 100-200 r/min.

In a specific embodiment, in Step C, stage heating is performed, to be specific, first-stage heating is performed at 100° C.-150° C. for 2-4 hours, and second-stage heating is performed at 200° C.-400° C. for 4-6 hours.

In a specific embodiment, in Step D, a calcining temperature is 450° C.-600° C., and a calcining temperature is 2-6 hours.

In a specific embodiment, in Step D, microwave calcination is used, a microwave generation frequency during the microwave calcination is preferably 2.45 GHz.

In a specific embodiment, in Step D, the ball milling indicates that the calcined lithium sulfide is subjected to ball milling 5-10 hours at a stirring rate of 100-500 r/min.

In a specific embodiment, in Step B and Step C, inert gas is argon or nitrogen; in Step D, the calcination is performed in a nitrogen protective atmosphere, and the ball milling is performed in a closed condition protected by the inert atmosphere.

The second purpose of the invention is to provide EV-grade high-purity lithium sulfide.

In order to achieve the second purpose of the invention, the EV-grade high-purity lithium sulfide is prepared by the preparation method for EV-grade high-purity lithium sulfide, where the mass purity of the EV-grade high-purity lithium sulfide is above 99.9%, and the whiteness thereof is above 80, and D50≤15 μm.

In a specific embodiment, the mass purity of the EV-grade high-purity lithium sulfide is above 99.95%, and the whiteness thereof is above 82.5.

Beneficial Effect:

The invention provides a preparation method for EV-grade high-purity lithium sulfide; in the preparation method, the lithium hydroxide monohydrate and the sulfur powder are ground and mixed, so as to ensure that raw materials are well mixed and contacted; in the presence of hydrazine hydrate as a reducing agent, redox reaction occurs between the lithium hydroxide monohydrate and the sulfur powder to obtain a lithium sulfide intermediate slurry; the lithium sulfide intermediate slurry is subjected to secondary reaction and dried through heating to obtain the crude lithium sulfide product; the crude lithium sulfide product is calcined and subjected to ball milling to increase the whiteness thereof, so as to finally obtain an EV-grade lithium sulfide product, where the mass purity of the product is above 99.9%, the whiteness thereof (blue whiteness) is above 80, and D50≤15 μm.

The lithium sulfide prepared by the method has the advantages of simple operation process, high safety, low energy consumption, low equipment requirements and low production cost, and therefore it is applied to industrial production.

DETAILED DESCRIPTION OF THE INVENTION

In order to achieve the first purpose of the invention, the preparation method for EV-grade high-purity lithium sulfide includes:

A. mixing and well grinding a lithium source and a sulfur source to obtain a mixture;

B. primary reaction: mixing the mixture with hydrazine hydrate in an inert atmosphere and reacting to obtain an intermediate slurry;

C. secondary reaction: performing secondary reaction on the intermediate slurry in the inert atmosphere and drying to obtain a crude lithium sulfide product; and D. calcining and ball milling the crude lithium sulfide product to obtain the EV-grade high-purity lithium sulfide.

In Step B and Step C, a reaction principle is as follows:

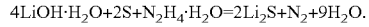

$$4LiOH \cdot H_2O + 2S + N_2H_4 \cdot H_2O = 2Li_2S + N_2 + 9H_2O.$$

Primary reaction is performed in Step B, where mixed raw materials are transferred to a reaction device protected by inert gas, and then hydrazine hydrate is added and stirred to obtain a lithium sulfide intermediate slurry. A large number of bubbles are generated during initial reaction, an addition rate of hydrazine hydrate is related to an amount of reactants. If the amount of reactants is large, the hydrazine hydrate is added too fast, and a large number of bubbles are generated due to violent reaction, which leads to the overflow of reaction materials. Therefore, the hydrazine hydrate needs to be added in batches, and the addition rate thereof is controlled mainly according to the reaction degree of the reactants; the hydrazine hydrate is preferably added in three batches, with an interval of 0.5-1 hour.

In a specific embodiment, in Step A, the lithium source is at least one of lithium hydroxide monohydrate, lithium sulfite and lithium thiosulfate, and the sulfur source is at least one of sulfur powder, lithium sulfite and lithium thiosulfate.

In a specific embodiment, in Step A, the lithium source is lithium hydroxide monohydrate, and the sulfur source is sulfur powder.

The lithium hydroxide monohydrate and the sulfur powder are ground and mixed, so as to ensure that raw materials are well mixed and contacted; in the presence of hydrazine hydrate as a reducing agent, redox reaction occurs between the lithium hydroxide monohydrate and the sulfur powder to obtain a lithium sulfide intermediate slurry; the lithium sulfide intermediate slurry is subjected to secondary reaction and dried through heating to obtain a crude lithium sulfide product; the crude lithium sulfide product is calcined and subjected to ball milling to increase the whiteness thereof, so as to finally obtain an EV-grade lithium sulfide product.

In a specific embodiment, in Step A, the lithium source and the sulfur source are added in a molar ratio of $Li_2O:S=1:1-2$.

The molar ratio of the invention refers to the ratio of the amount of substance. Lithium is calculated as $Li_2O$ and the sum of the molar weight of LizO in all raw materials, and S is also the sum of the molar weight of sulfur in all raw materials.

In a specific embodiment, in Step B, the hydrazine hydrate is added in a molar ratio of $Li_2O:N2H_2 \cdot H_2O=1:2-4$; preferably, the hydrazine hydrate is added in three batches, with an interval of 0.5-1 hour for each addition.

In a specific embodiment, in Step B, the mixing and reaction includes stirring at 30° C.-70° C. for 1-5 hours; and a stirring speed is preferably 100-200 r/min.

In a specific embodiment, in Step C, stage heating is performed, to be specific, first-stage heating is performed at 100° C.-150° C. for 2-4 hours, and second-stage heating is performed at 200° C.-400° C. for 4-6 hours.

Secondary reaction and drying are performed in Step C; the lithium sulfide intermediate slurry is transferred to a reaction vessel protected by inert gas and heated in stages for further reaction and drying to obtain the crude lithium sulfide product. In the invention, stage heating is performed to avoid too high heating temperature, bumping during liquid evaporation and slurry overflowing; if the temperature is too low, the raw materials are insufficiently reacted, and the product quality degrades.

In a specific embodiment, in Step D, a calcining temperature is 450° C.-600° C., and a calcining temperature is 2-6 hours.

In a specific embodiment, in Step D, microwave calcination is used, and a microwave generation frequency during the microwave calcination is preferably 2.45 GHz.

The microwave calcination is based on the penetrability of microwave and the targeted absorption effect of medium with high dielectric loss. Polar molecules are subjected to dipole turning and directional arrangement in the electromagnetic field by microwave, and the high-rate turning and arrangement intensifies the collision of molecules, thereby leading to the temperature rise of the system. For impurities in the crude lithium sulfide product, for example, sulfur, polysulfide and residual hydrazine hydrate, the boiling point of impurities can be quickly reached by heating, so as to achieve the effect of removing impurities and whitening. In addition, the high-frequency directional rotation of polar molecules under the action of microwave increases the effective collision between the molecules, so that the impurities such as sulfur coated inside lithium sulfide molecules can be dispersed. Compared with traditional calcination methods, microwave calcination feature in mild conditions, fast heating rate, heating uniformity, high efficiency, and ease of control.

In a specific embodiment, in Step D, the ball milling indicates that the calcined lithium sulfide is subjected to ball milling 5-10 hours at a stirring rate of 100-500 r/min.

In a specific embodiment, in Step B and Step C, inert gas is argon or nitrogen; in Step D, the calcination is performed in a nitrogen protective atmosphere, and the ball milling is performed in a closed condition protected by the inert atmosphere.

In order to achieve the second purpose of the invention, the EV-grade high-purity lithium sulfide is prepared by the preparation method for EV-grade high-purity lithium sulfide, where the mass purity of the EV-grade high-purity lithium sulfide is above 99.9%, and the whiteness thereof is above 80, and D50≤15 μm.

In a specific embodiment, the mass purity of the EV-grade high-purity lithium sulfide is above 99.95%, and the whiteness thereof is above 82.5.

The following will make a further description for the specific embodiments of the invention with reference to examples, but this does not limit the invention to the scope of the embodiments.

Example 1

Lithium hydroxide monohydrate, sulfur powder and hydrazine hydrate were taken in a molar ratio of $Li_2O:S:N_2H_4 \cdot H_2O=1:1:3$, and the lithium hydroxide monohydrate and the sulfur powder were mixed and ground in a grinder. Ground raw materials were placed into a reaction device protected by argon, hydrazine hydrate was added in batches, and reaction between the ground raw materials and the hydrazine hydrate was made for 1 hour at a stirring rate of 100 r/min and a temperature of 30° C. A lithium sulfide intermediate slurry was transferred to a reaction vessel protected by argon, subjected to reaction at 100° C. for 2 hours in a first stage, and then dried at 300° C. for 4 hours through heating to obtain the crude lithium sulfide product. Then, the crude lithium sulfide product was transferred to a microwave calcining furnace, and calcined at 450° C. for 2 hours in a nitrogen protective atmosphere to obtain high-whiteness lithium sulfide. The calcined lithium sulfide was placed a sealed ball milling tank and subjected to ball milling for 5 hours at room temperature at a stirring rate of 100 r/min to obtain a lithium sulfide product $Li_2S$-1. The purity, whiteness, particle size and other parameters of the obtained product are as shown in Table 1.

Example 2

Lithium hydroxide monohydrate, sulfur powder and hydrazine hydrate were taken in a molar ratio of $Li_2O:S:N_2H_4 \cdot H_2O=1:2:3.5$, and the lithium hydroxide monohydrate and the sulfur powder were mixed and ground in a grinder. Ground raw materials were placed into a reaction device protected by argon, hydrazine hydrate was added in batches, and reaction between the ground raw materials and the hydrazine hydrate was made for 3 hours at a stirring rate of 150 r/min and a temperature of 30° C. A lithium sulfide intermediate slurry was transferred to a reaction vessel protected by argon, subjected to reaction at 120° C. for 3 hours in a first stage, and dried at 350° C. for 5 hours through heating to obtain the crude lithium sulfide product. Then, the crude lithium sulfide product was transferred to a microwave calcining furnace, and calcined at 500° C. for 4 hours in a nitrogen protective atmosphere to obtain high-whiteness lithium sulfide. The calcined lithium sulfide was placed a sealed ball milling tank and subjected to ball milling for 8 hours at room temperature at a stirring rate of 300 r/min to obtain a lithium sulfide product $Li_2S$-2. The purity, whiteness, particle size and other parameters of the obtained product are as shown in Table 1.

Example 3

Lithium hydroxide monohydrate, sulfur powder and hydrazine hydrate were taken in a molar ratio of $Li_2O:S:N_2H_4 \cdot H_2O=1:2:4$, and the lithium hydroxide monohydrate and the sulfur powder were mixed and ground in a grinder. Ground raw materials were placed into a reaction device protected by argon, hydrazine hydrate was added in batches, and reaction between the ground raw materials and the hydrazine hydrate was made for 5 hours at a stirring rate of 200 r/min and a temperature of 30° C. A lithium sulfide intermediate slurry was transferred to a reaction vessel protected by argon, subjected to reaction at 150° C. for 4 hours in a first stage, and dried at 400° C. for 6 hours through heating to obtain the crude lithium sulfide product. Then, the crude lithium sulfide product was transferred to a microwave calcining furnace, and calcined at 600° C. for 6 hours in a nitrogen protective atmosphere to obtain high-whiteness lithium sulfide. The calcined lithium sulfide was placed a sealed ball milling tank and subjected to ball milling for 10 hours at room temperature at a stirring rate of 500 r/min to obtain a lithium sulfide product $Li_2S$-3. The purity, whiteness, particle size and other parameters of the obtained product are as shown in Table 1.

Comparative Example 1

The comparative example provides a preparation method for lithium sulfide, where the method is similar to the method in Example 3, except that the lithium sulfide product is obtained directly after Step C, without subsequent calcining and ball milling steps. The lithium sulfide obtained in the comparative example has low purity and whiteness because a small amount of impurities such as sulfur powder, polysulfide and hydrazine hydrate remain in the dried product. The purity, whiteness, particle size and other parameters of the obtained product are as shown in Table 1.

TABLE 1

Purity, whiteness and particle sizes in examples and comparative example

| Product number | | | $Li_2S$-1 | $Li_2S$-2 | $Li_2S$-3 | $Li_2S$-4 |
|---|---|---|---|---|---|---|
| Chemical composition (%) | Main content | | 99.96 | 99.95 | 99.98 | 98.72 |
| | Impurity | Na | 0.0058 | 0.0085 | 0.0037 | 0.014 |
| | | K | 0.00051 | 0.00066 | 0.00032 | 0.0021 |
| | | Ca | 0.00086 | 0.00086 | 0.0022 | 0.0051 |
| | | Mg | 0.00033 | 0.00022 | 0.000021 | 0.0045 |
| | | Si | 0.0049 | 0.0043 | 0.0047 | 0.012 |
| | | Al | 0.0001 | 0.00052 | 0.00037 | 0.0092 |
| | | Fe | 0.00003 | 0.00063 | 0.00016 | 0.0016 |
| | | Zn | 0.00018 | 0.0002 | — | 0.0043 |

TABLE 1-continued

Purity, whiteness and particle sizes in examples and comparative example

| Product number | | $Li_2S$-1 | $Li_2S$-2 | $Li_2S$-3 | $Li_2S$-4 |
|---|---|---|---|---|---|
| | Ni | 0.00002 | 0.00001 | — | 0.00008 |
| | Cr | 0.00004 | 0.00002 | — | 0.00012 |
| | Mn | 0.00002 | 0.00001 | — | 0.00007 |
| | Co | — | — | — | 0.00023 |
| | Pb | — | — | 0.000012 | 0.00028 |
| | Ti | 0.0007 | 0.00036 | 0.00045 | 0.00013 |
| Whiteness | | 81.81 | 82.6 | 83.2 | 73.2 |
| $D_{50}$ (μm) | | 20.472 | 14.356 | 10.091 | 63.568 |

The invention claimed is:

1. A preparation method for EV-grade high-purity lithium sulfide, comprising:
   A. mixing and grinding a lithium source and a sulfur source to obtain a mixture;
   B. primary reaction: mixing the mixture with hydrazine hydrate in an inert atmosphere and reacting to obtain an intermediate slurry;
   C. secondary reaction: performing secondary reaction on the intermediate slurry in the inert atmosphere and drying to obtain a crude lithium sulfide product, wherein in Step C, stage heating is performed, the secondary reaction comprises first-stage heating at 100° C.-150° C. for 2-4 hours, followed by second-stage heating at 200° C.-400° C. for 4-6 hours; and
   D. calcining and ball milling the crude lithium sulfide product to obtain the EV-grade high-purity lithium sulfide, wherein in Step D, microwave calcination is employed, a calcining temperature is 450° C.-600° C., and a calcining time is 2-6 hours.

2. The preparation method for EV-grade high-purity lithium sulfide according to claim 1, wherein in Step A, the lithium source is at least one of lithium hydroxide monohydrate, lithium sulfite and lithium thiosulfate, and the sulfur source is at least one of sulfur powder, lithium sulfite and lithium thiosulfate.

3. The preparation method for EV-grade high-purity lithium sulfide according to claim 1, wherein in Step A, the lithium source and the sulfur source are added in a molar ratio of $Li_2O:S=1:1-2$.

4. The preparation method for EV-grade high-purity lithium sulfide according to claim 1, wherein in Step B, the hydrazine hydrate is added in a molar ratio of $Li_2O:N_2H_2 \cdot H_2O=1:2-4$.

5. The preparation method for EV-grade high-purity lithium sulfide according to claim 1, wherein the hydrazine hydrate is added in three batches, with an interval of 0.5-1 hour for each addition.

6. The preparation method for EV-grade high-purity lithium sulfide according to claim 1, wherein in Step B, the mixing and reaction comprises stirring at 30° C.-70° C. for 1-5 hours.

7. The preparation method for EV-grade high-purity lithium sulfide according to claim 6, wherein a stirring speed is 100-200 r/min.

8. The preparation method for EV-grade high-purity lithium sulfide according to claim 1, wherein a microwave generation frequency during the microwave calcination is 2.45 GHz.

9. The preparation method for EV-grade high-purity lithium sulfide according to claim 1, wherein in Step D, the ball milling indicates that the calcined lithium sulfide is subjected to ball milling 5-10 hours at a rotating speed of 100-500 r/min.

10. The preparation method for EV-grade high-purity lithium sulfide according to claim 1, wherein in Step B and Step C, inert gas is argon or nitrogen; in Step D, the calcination is performed in a nitrogen protective atmosphere, and the ball milling is performed in a closed condition protected by the inert atmosphere.

11. EV-grade high-purity lithium sulfide, wherein the EV-grade high-purity lithium sulfide is prepared by the preparation method for EV-grade high-purity lithium sulfide according to claim 9, and the mass purity of the EV-grade high-purity lithium sulfide is above 99.9%, and the whiteness thereof is above 80, and $D50 \leq 15$ μm.

12. The EV-grade high-purity lithium sulfide according to claim 11, wherein the mass purity of the EV-grade high-purity lithium sulfide is above 99.95%, and the whiteness thereof is above 82.5.

* * * * *